United States Patent

Martreuil et al.

[11] Patent Number: 5,935,513
[45] Date of Patent: Aug. 10, 1999

[54] METHOD FOR SINTERING CERAMIC TUBES

[75] Inventors: Martial Martreuil, Bartres; Jacques Gillot, Odos; Phillippe Henneguez, Tarbes, all of France

[73] Assignee: Societe des Ceramiques Techniques, Bazet, France

[21] Appl. No.: 09/006,987

[22] Filed: Jan. 14, 1998

[30] Foreign Application Priority Data

Jan. 27, 1997 [FR] France ................................. 97 00847

[51] Int. Cl.$^6$ ...................................................... C04B 35/64
[52] U.S. Cl. ........................ 264/608; 264/605; 264/607; 264/671; 264/672; 264/673
[58] Field of Search .................................. 264/605, 607, 264/608, 671, 672, 673

[56] References Cited

U.S. PATENT DOCUMENTS

| 3,887,327 | 6/1975 | Weber et al. . | |
| 3,950,463 | 4/1976 | Jones | 264/671 |
| 4,056,589 | 11/1977 | LIngscheit | 264/671 |
| 4,344,904 | 8/1982 | Yamada | 264/662 |
| 4,364,877 | 12/1982 | Clement et al. . | |
| 4,752,427 | 6/1988 | Wakai | 264/664 |

OTHER PUBLICATIONS

Chem. Abstracts vol. 104, No. 14, Apr. 7, 1986, Abstract No. 114864f.

*Primary Examiner*—James Derrington
*Attorney, Agent, or Firm*—Michael N. Meller

[57] ABSTRACT

A method for sintering tube pre-forms in an furnace for obtaining ceramic tubes which are extremely straight is provided, in which, during sintering, the tube preforms are placed inside supporting tubes in ceramic material, the support tubes 1 containing the tube preforms being arranged parallel to each other forming stacks 7 of layers 3 supported by support plates 4 in a refractory material, the inside surface of the support tubes being out-of-true by less than 0.1 mm over a length of 90 mm.

19 Claims, 2 Drawing Sheets

METHOD FOR SINTERING CERAMIC TUBES

BACKGROUND OF THE INVENTION

The present invention relates to a method for heat treatment and sintering of ceramic tubes mainly composed of zirconia, having an inside diameter less than a few millimeters, with a wall thickness of a few tenths of a millimeter and length of a few centimeters. It particularly concerns a method making it possible to obtain such tubes which are highly accurate as regards their straightness directly after sintering, without the need for subsequent machining. Such tubes are notably used as sleeves or ferrules for assembling fiber optic connectors.

It is known to produce ceramic tubes having an inside diameter less than a few millimeters, a wall thickness of a few tenths of a millimeter and a length of a few centimeters by a method in which a pre-form consisting of a mixture of ceramic powder and organic binders is shaped by isostatic pressing or injection, followed by heat treatment in order to drive out binders and sinter the ceramic material to densify and consolidate it.

The inside surface of a tube pre-form obtained after this isostatic pressing or injection step is very close to a perfect cylinder as it results from molding the mixture of ceramic powder and binder on a metal core rod which can be readily machined with a high degree of accuracy. Cross-sections of the inside surface of the tube pre-form, perpendicular to its longitudinal axis, are circles. Sections of this inside surface on planes passing through said axis are straight lines which generate the cylinder constituting said inside surface.

During the sintering heat treatment, the tube pre-forms undergo several transformations: the organic binders they contain are volatilized by evaporation or oxidation and the mineral part of the tube becomes densified and consolidated, leading to shrinkage which can be up to 15% to 25% in each direction. Depending on the dimensions and the respective positions of the various parts of refractory material used for positioning the tube pre-forms in the oven and, depending on the heat treatment program, such shrinkage may or may not be accompanied by deformation. In particular, the pre-form, which was rectilinear, bends, thus no longer being straight, while sections of its inside surface, perpendicular to its major length, remain circles of constant diameter from one end to the other. The extent to which the preform is out-of-true, or its straightness defect is measured over its total length by introducing different diameter cylindrical gauges into the pre-form: the straightness defect is defined as being the difference between the diameter of the inside cross-section of the part and the diameter of the largest cylindrical gauge which freely enters the part over all its length. This also corresponds to the fact that if d is the straightness error over a length L, the intersection of the generally cylindrical inside surface of the tube and a plane passing through the axis of this cylinder is a curve which, over a length L, does not deviate by more than d/2 from a straight line, in each direction.

When known sintering methods are used to obtain a tube having the dimensions of an order of magnitude cited above, and of which the exact shape is highly accurate as regards straightness of its inside surface, it is necessary, in view of such deformation, to perform a supplementary machining operation on this surface after sintering, which is difficult in view of the small inside diameter involved, and expensive.

SUMMARY OF THE INVENTION

The present invention makes it possible to resolve, in an advantageous fashion, the problems encountered when known methods are implemented, and makes it possible to resolve the problem of obtaining perfect straightness. It has additionally been noted that, surprisingly and unexpectedly, the members used to position tube pre-forms in the oven, when they are submitted to high temperatures, do not suffer from flow or creep, and thus do not deform. Additionally, the method according to the invention not only makes it possible to use such members over and over again many times, but also allows optimum use of the ovens, which obviously results in tube preforms being obtained, according to the invention, more economically.

The aim of the invention is thus to produce ceramic tubes having an inside diameter of one to a few millimeters, a wall thickness of a few tenths of a millimeter, and a length of a few centimeters which are extremely straight, without the need for a machining operation after sintering. Another aim is to provide an extremely compact manner of loading tube pre-forms into the sintering furnace, enabling a large number of tube pre-forms to be sintered in each batch, thereby decreasing the cost of sintering each individual tube.

The present invention relates to a method of sintering heat treatment of tube pre-forms in a furnace for obtaining ceramic tubes which are extremely straight, in which, during sintering, the tube pre-forms are placed inside supporting tubes in ceramic material.

The invention provides a method for sintering tube pre-forms in which the inside surface of said support tubes does not substantially deviate from an ideal cylinder, the defect in straightness of said surface being less than 0.1 mm over a length of 90 mm.

In one embodiment of the method according to the invention, the support tubes containing the tube pre-forms are arranged parallel to each other forming stacks of layers supported by support plates in a refractory material.

In one embodiment of the invention, each stack is formed by at least five layers of refractory material support tubes.

A batch for the furnace preferably consists of at least one stack of several charge units, each charge unit being constituted of a support plate on which several layers placed one above the other are arranged, and of pillars in refractory material supporting a support plate arranged immediately thereabove.

In a preferred embodiment, within one charge unit, the distance between the top of the upper layer and said support plate immediately above it is a maximum of 40 mm.

The furnace is preferably heated by combustion of natural gas.

In one preferred embodiment, the support tubes are constituted of alumina having a purity better than 97%, preferably better than 98%, the mean crystal size of which is greater than 10 microns.

In a further embodiment of the invention, the support tubes consist of alumina of purity better than 99.5%, the mean crystal size of which is greater than 10 microns.

In one embodiment of the method, the mineral portion of said tube preforms consists of yttriated zirconia containing 2 to 4 mol % $Y_2O_3$ and constituted of particles of mean size less than 1 micron.

The sintering cycle preferably comprises a temperature rise up to a temperature comprised between 1450° C. and 1550° C. followed by a plateau of duration 1 to 3 hours at this temperature, followed by cooling, the duration between the start of increase in temperature and the end of said plateau being at the most 38 hours.

In one embodiment, the ratio between the inside diameter of the support tubes and the outside diameter of the tube pre-forms is greater than 1.25.

In a further embodiment, the tube pre-forms have an inside diameter comprised between 1.8 and 2.2 mm and an outside diameter comprised between 3 mm and 4 mm, the support tubes having an inside diameter greater than 4.5 mm.

In yet a further embodiment, the tube pre-forms have an inside diameter comprised between 1.85 and 2.1 mm and an outside diameter comprised between 3.3 mm and 3.7 mm, the support tubes having an inside diameter comprised between 4.5 mm and 8 mm.

In one preferred embodiment, each support tube only contains one tube pre-form.

The ratio between the length of the support tubes and the length of the tube pre-forms is preferably comprised between 0.85 and 1.5.

In yet a further embodiment of the invention, each support tube contains several tube pre-forms arranged longitudinally in line.

The characteristics of the invention will become clear from the description which follows and the drawings provided by way of non-limiting example.

BRIEF DESCRIPTION OF THE DRAWINGS

FIGS. 1 and 2 (which is subdivided into FIGS. 2a and 2b) shows a tube pre-form fitted on a support tube, viewed respectively in transverse and longitudinal cross-section, at the start of sintering. The tube pre-form shown in FIG. 2b corresponds to one embodiment of the method of the invention in which the tube pre-form extends from each of the ends of the support tube, which is not the case in the embodiment of the method in which the tube pre-form is in a position such as shown in FIG. 2a.

DETAILED DESCRIPTION OF PREFERRED EMBODIMENTS

Figure 1:
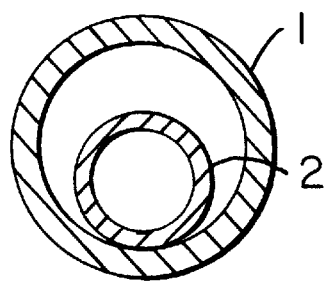
Figure 2B:
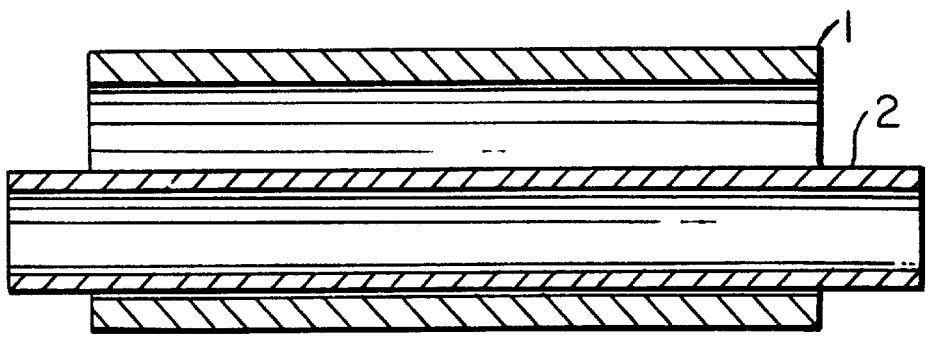
Figure 2A:
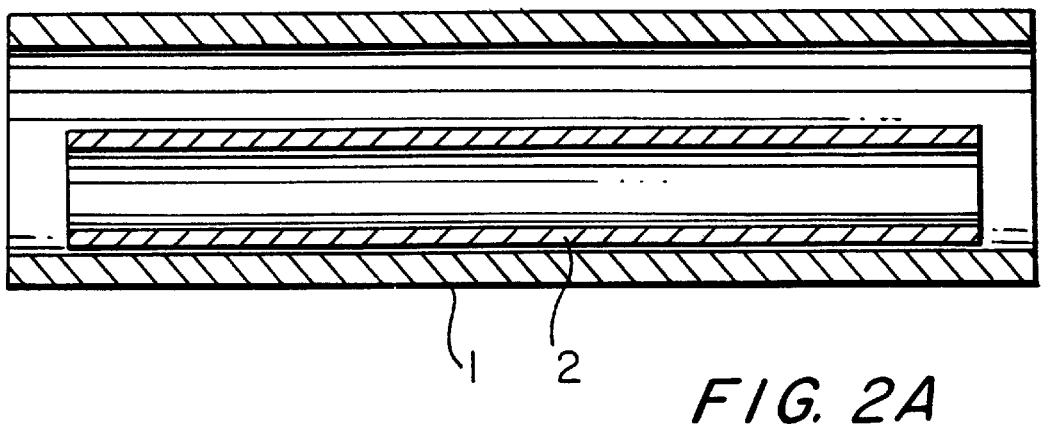

FIGS. 1, 2a and 2b show tubes 1 in refractory material in which tube pre-forms 2 are inserted.

Figure 3:
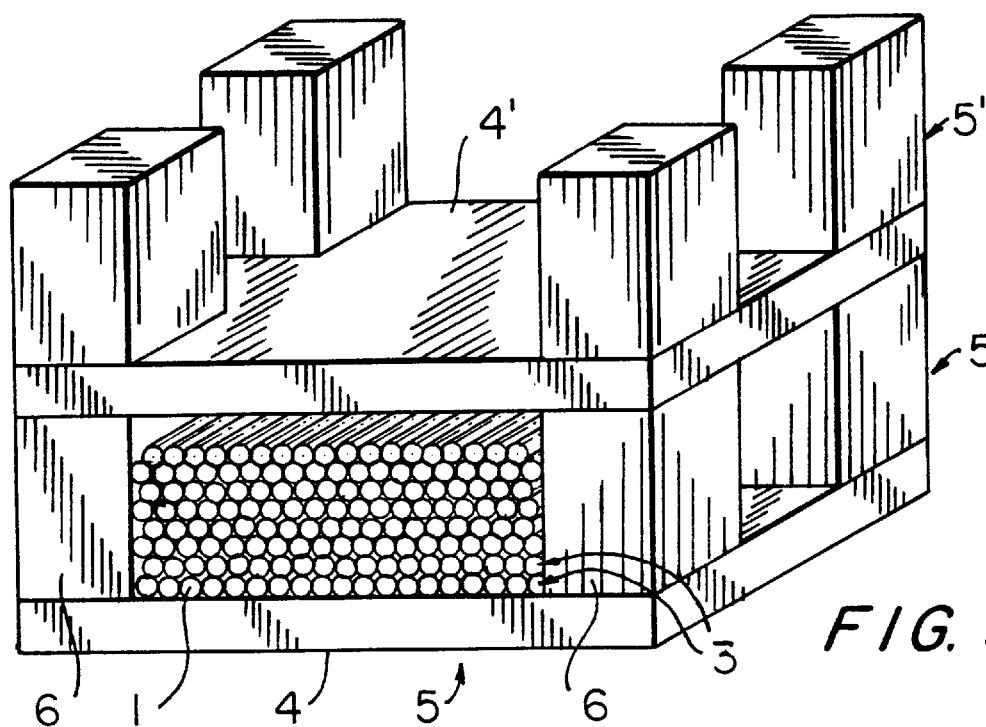
FIG. 3 shows an furnace charging unit and the refractory support plate and pillars of the charging unit immediately above, in line with one embodiment of the method of the invention.

It has been found that defects in straightness can be minimized if, during the sintering operation, the tube pre-forms 2 are placed, as shown in FIGS. 1 and 2, inside refractory material tubes 1, which here are referred to as support tubes 1, having suitable composition and dimensions. The support tubes 1 are advantageously arranged parallel to each other in order to form, as can be seen in FIG. 3, several layers 3 one above the other arranged on plates in ceramic material, referred to here as the support plates 4, and which are substantially horizontal. The furnace charge advantageously consists of several sets 5, referred to here as units of charge 5, each unit of charge 5 being constituted as shown in FIG. 3, of a support plate 4, of support tubes 1, each of which contains a tube pre-form 2, arranged to form several layers 3, and refractory material parts which here are referred to as pillars 6, arranged at various points on the support plate, supporting support plate 4' which constitutes part of the charge unit 5' immediately above it. The charge units 5, 5' etc. can thus be stacked one above the other, a furnace batch then consisting of one or several stacks 7 each comprising at least one charge unit.

The support tubes 1 are preferably made of a refractory oxide which has characteristics ensuring it does not react with the tube pre-forms 2 while the latter are being sintered, and that the support tubes 1 do not get deformed during repeated heat treatments, allowing them to be re-used many times, and that the support tubes can be produced at a fairly low price. It was found that tubes constituted of alumina of a purity better than 97%, preferably over 98% and more particularly above 99.5% are very suitable for obtaining support tubes 1. Preferably these support tubes 1 are of a structure composed of crystals the mean dimension of which is at least 10 microns.

Indeed, it has been noted that, when the crystals are very small, support tubes tend to get deformed by creep, thereby no longer being straight.

Such tubes are particularly suitable for sintering tubes of yttriated zirconia containing 2 to 4 mol % yttrium.

The temperature program followed to perform sintering heavily influences straightness of the tubes resulting from the tube pre-forms. It would be expected that a program only comprising slow variations in temperature, ensuring temperatures of the tubes to be sintered are highly homogeneous, would produce very straight tubes. Surprisingly, it has been found, on the contrary, that the temperature build-up program needs to be fairly fast to ensure good straightness of the sintered tubes. It has for example been noted that in order to obtain highly straight tubes from tube pre-forms in zirconia-3 mol % yttrium, of an inside diameter comprised between 1.8 and 2.2 mm and an outside diameter comprised between 3 mm and 4 mm and a length of 90 mm, fitted inside support tubes having an inside diameter comprised between 5 and 15 mm, it is necessary to employ a sintering program the cumulative duration of the temperature rise of which, starting from 20° C. levelling off to a maximum temperature comprised between 1450 and 1550° C. does not exceed 38 hours.

The ceramic tubes obtained by this process from tube pre-forms 2, are used in applications where high dimensional accuracy is essential. In particular, after trimming their outer surface and cutting them to length, they are used as components of optical fiber connectors.

EXAMPLE 1
(as Per the Invention)

Tube pre-forms of inside diameter 2.00 mm, 3.50 mm outside diameter and 90 mm length were prepared by isostatic pressing of pulverized grains of 3 mol % Y2O3 yttriated zirconia (TZ3YB from the Japanese company Tosoh). As the core rod used for isostatic pressing was extremely straight, tube pre-forms having a straightness error below 0.02 mm were obtained. Each tube pre-form 2 was placed for sintering in a support tube 1 with a diameter below 5 mm, an outside diameter of 8 mm and a length of 100 mm, and an error in straightness below 0.08 mm (FIG. 1 and 2a). These support tubes 1 were of alumina of a purity of 99.7%, of mean crystal size 25 microns.

Figure 4:
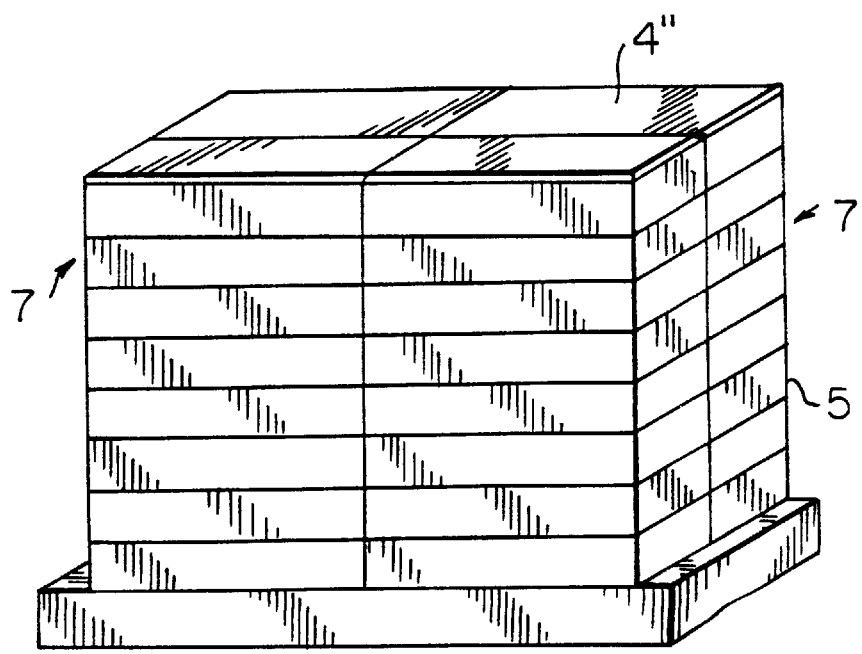
FIG. 4 shows a stack, as per one embodiment of the method of the invention, of loading units on the base of the furnace.

To sinter the tube pre-forms 2, the support tubes 1 containing them were then arranged on rectangular refractory plates which, here, are referred to as support plates 4, of size 270 mm by 300 mm, and a thickness of 20 mm. The support tubes 1, containing the tube pre-forms, were arranged parallel to each other on each support plate 4 in eight stacked horizontal layers 3, each containing 17 or 18 support tubes. Within each layer 3 the support tubes were arranged compactly, meaning that each support tube touched its two neighbors. Several sets of layers 3 were arranged on each support plate 4, the layers being retained laterally by refractory parts 6, also called pillars 6 here, as can be seen in FIG. 3. The refractory parts 6 holding the support tube 1 layers laterally also act as pillars for sustaining the support plate 4' of the charge unit 5' located immediately above. Several charge units are stacked in their turn in the furnace. The furnace batch consists of four stacks 7 (shown diagrammatically on FIG. 4) each comprising 8 charge units 5. A support plate 4", similar to support plate 4, was placed on top of the uppermost charge unit 5 of each stack 7. Within each charge unit 5, there was a distance of 20 mm between the top of the upper layer 3 and the lower side of support plate 4'.

It should be noted that this system of placing layers 3 of support tubes 1 one on top of the other provides very high furnace charging density.

The arrangement provided inside of the furnace was sintered by combustion of natural gas, using the following temperature program:

increase from 20 to 500° C. at 40° C./hour increase from 500 to 1400° C. at 100° C./hour increase from 1400 to 1500° C. at 50° C./hour plateau at 1500° C. for two hours natural cooling down of the furnace giving a total duration for the temperature to rise and remain at the sintering plateau of 25 hours.

The zirconia tubes resulting from sintering the tube preforms had an inside diameter of 1.56 mm, an outside diameter of 2.72 mm and a length of 70 mm. Measurement with a 1.46 mm diameter gauge showed that none of the tubes was out of true by more than 0.1 mm.

EXAMPLE 2
(as Per the Invention)

Tube pre-forms identical to those in the example 1 were sintered. For this, they were placed in support tubes of inside diameter 6 mm, outside diameter 8 mm and a length of 80 mm, their straightness error being less than 0.08 mm. These support tubes consisted of 99.8% pure alumina the crystals of which had a mean size of 50 microns. As the tube pre-forms were slightly longer than the support tubes, at the time they were introduced into the furnace, each tube pre-form extended out 5 mm from each end of the support tube (FIG. 2b). At the end of sintering, due to the sintering shrinkage, the sintered tubes were shorter than the support tubes and were thus fully contained within the latter.

Sintering was done in the same furnace and under the same conditions as in example 1. Gauge measurement showed that only 1% of the sintered tubes had a straightness error greater than 0.1 mm.

EXAMPLE 3
(as Per the Invention)

Pre-form tubes identical to those in example 1 were sintered. For this, they were placed inside support tubes of inside diameter 15 mm, outside diameter 20 mm and length 200 mm, the straightness defect of which, measured over a length of 100 mm, was below 0.08 mm. The support tubes consisted of 99.7% pure alumina the crystals of which had an average size of 15 micron. Two tube pre-forms were placed in line inside each support tube. Sintering was done in the same furnace and under the same conditions as in example 1, the only differences being that each set of layers consisted of 3 layers one on top of the other, each containing 6 or 7 support tubes and that within each charge unit, the distance separating the top of the uppermost layer and the lower side of the support plate situated immediately above was 25 mm.

After sintering, none of the zirconia tubes obtained had a straightness error greater than 0.1 mm.

EXAMPLE 4
(as Per the Invention)

Pulverized grain of zirconia with 3 mol % Y2O3 was put into the form of pre-form tubes of inside diameter 1.80 mm, outside diameter 3.00 mm and length 75 mm by isostatic pressing. Their straightness defect was less than 0.02 mm. For sintering, each tube pre-form was placed inside a support tube having an inside diameter of 5 mm, an outside diameter of 8 mm and a length of 80 mm, the straightness defect of which was less than 0.05 mm. The support tubes consisted of 99.8% pure alumina the crystals of which had a mean dimension of 25 micron.

They were sintered using the same arrangement within the furnace and the same temperature program as in example 1. The zirconia tubes obtained after sintering had an inside diameter of 1.40 mm, an outside diameter of 2.33 mm, a length of 58 mm and a defect in straightness less than 0.07 mm.

EXAMPLE 5
(as Per the Invention)

Pulverized grain of zirconia with 3 mol % Y2O3 was put into the form of pre-form tubes of inside diameter 2.20 mm, outside diameter 4.00 mm and length 105 mm by isostatic pressing. Their straightness defect was less than 0.02 mm. For sintering, each tube pre-form was placed inside a support tube having an inside diameter of 7 mm, an outside diameter of 11 mm and a length of 120 mm, the straightness defect of which was less than 0.08 mm. The support tubes consisted of 99.8% pure alumina the crystals of which had a mean dimension of 25 micron.

Sintering was done in the same furnace and under the same conditions as in example 1, the only differences being that each set of layers consisted of 6 layers placed one above the other, each containing 12 or 13 support tubes. The zirconia tubes obtained after sintering had an inside diameter of 1.71 mm, an outside diameter of 3.11 mm, a length of 82 mm and a straightness defect less than 0.1 mm.

EXAMPLE 6
(as Per the Invention)

Tube pre-forms having an inside diameter of 2.00 mm, an outside diameter of 3.50 mm and a length of 16 mm were prepared. For sintering, 5 tube pre-forms were placed in line inside support tubes identical to those in example 1. They were sintered under the same conditions as in example 1, the furnace being charged with the same number of support tubes placed in the same arrangement.

The zirconia tubes obtained after sintering had an inside diameter of 1.56 mm, an outside diameter of 2.72 mm, a length of 12.5 mm and a straightness error less than 5 microns.

EXAMPLE 7
(as Per the Invention)

Tube pre-forms identical to those in example 1 were prepared and arranged, with 10 and 9 tubes respectively in each layer, in two layer on square support plates of 200 mm side, using the same support tubes as in example 1, and with a distance of 20 mm between the top of the upper layer and the lower side of the support plate located immediately above. A stack of 3 of these charge units were charged into an electrically-heated furnace, and the tube pre-forms were sintered using the following temperature program:

temperature rise from 20 to 500° C. at 60° C./hour temperature rise from 500 to 700° C. at 180° C./hour temperature rise from 700 to 1500° C. at 300° C./hour plateau at 1500° C. during 2 hours natural cooling in furnace equivalent to a total duration of temperature rise and plateau for sintering of 13.8 hours.

Following sintering, the zirconia tubes obtained had a straightness error less than 0.1 mm.

EXAMPLE 8
(as Per the Invention)

Tube pre-forms identical to those in example 1 were obtained and sintered in the same furnace and under the same condition as in example 1, the only difference being the temperature program which was as follows:

temperature rise from 20 to 500° C. at 40° C./hour temperature rise from 500 to 1400° C. at 50° C./hour temperature rise from 1400 to 1500° C. at 25°C./hour plateau at 1500° C. during 2 hours natural cooling in furnace equivalent to a total duration of temperature rise and plateau for sintering of 36 hours.

Following sintering, the zirconia tubes obtained had a straightness error less than 0.1 mm.

EXAMPLE 9
(not as Per the Invention)

Tube pre-forms identical to those in example 1 were prepared and sintered in the same furnace and under the same conditions as in example 1, the only difference being the temperature program which was as follows temperature rise from 20 to 500° C. at 30° C./hour temperature rise from 500 to 1400° C. at 50° C./hour temperature rise from 1400 to 1500° C. at 25° C./hour plateau at 1500° C. during 2 hours natural cooling in furnace equivalent to a total duration of temperature rise and plateau for sintering of 40 hours for sintering.

Following sintering, 80% of the zirconia tubes obtained had a straightness error greater than 0.1 mm.

EXAMPLE 10
(not as Per the Invention)

Tube pre-forms identical to those in example 1 were sintered. For this, they were placed inside support tubes of inside diameter 4 mm, outside diameter 6.5 mm and length 100 mm, their straightness defect being less than 0.08 mm. The support tubes consisted of 99.8% pure alumina, the crystals of which had an average size of 25 microns, and having a porosity of 35% by volume, and an average pore diameter of 12 micron. Sintering was carried out in the same furnace and under the same conditions as in example 1, the only differences being that each set of layers consisted of 10 layers placed one above the other, each one of which contained 24 or 25 support tubes.

After sintering, 20% of the zirconia tubes obtained had a straightness defect higher than 0.1 mm.

EXAMPLE 11
(not as Per the Invention)

Tube pre-forms identical to those in example 1 were prepared and sintered in the same furnace and under the same conditions, as in example 1, the only differences being that the furnace charge consisted of 4 stacks each composed of 4 charge units and that, within each charge unit, the distance between the top of the upper layer and the lower side of the support plate situated immediately above was 60 mm.

After sintering, 10% of the zirconia tubes obtained had a straightness defect greater than 0.1 mm.

It is noted that this 10% reject rate in this example not as per the invention, is very distinctly greater and distinguishes itself very markedly from the maximum reject rate of 1% considered inherently obtained in example 2 as per the invention, which is the most unfavorable rate which the method according to the invention lead to.

EXAMPLE 12
(not as Per the Invention)

Tube pre-forms identical to those in example 1 were prepared and placed inside support tubes identical to those in example 3, which were arranged in the same manner and within the same furnace as in example 3. However, the tube pre-forms were arranged differently inside the support tubes: inside each support tube, 2 or 3 tube pre-forms were juxtaposed, not one in line with the other but rather side by side and touching, in the central portion of the length of the support tube. Sintering was done under the same conditions and with the same temperature program as in example 3.

Following sintering, it was noted that 50% of the zirconia tubes originating from the tube pre-forms placed side by side in pairs, and 85% of those which were placed side by side three by three, had a straightness defect above 0.1 mm.

EXAMPLE 13
(not as Per the Invention)

Tube pre-forms identical to those in example 1 were prepared and sintered in the same furnace and under the same conditions as in example 1, the only difference being that, within one of the charge units, support tubes of the same dimensions as those in example 1 were employed, but were constituted of a ceramic material only containing 97% by mass alumina, the remainder being a mixture of silicon and calcium oxides, forming a vitreous phase with a part of the alumina.

After sintering, it was noted that the zirconia tubes obtained in the support tubes of 97% alumina had a straightness defect less than 0.1 mm, but had patches on their surface resulting from a local chemical reaction between the zirconia and the support tube.

What is claimed is:

1. A method for sintering tube pre-forms in a furnace to thereby obtain ceramic tubes having excellent straightness which comprises placing said tube pre-forms inside support tubes, said tube pre-forms having an inside diameter of 1.8 to 2.2 mm and an outside diameter of 3 to 4 mm, said support tubes having an inside diameter greater than 4.5 mm, each such support tube containing one tube pre-form or a multiplicity of tube pre-forms arranged in longitudinal alignment;

wherein the support tubes containing the tube pre-forms are arranged parallel to one another thereby forming a multiplicity of stacks of layers including a top layer which layers are supported by a multiplicity of support plates comprised of a refractory material, each support tubes containing the tube pre-forms, each stacks of layers and each support plate constituting a charge unit, and wherein in respect to each stack, the distance between the top of the top layer and a support plate immediately above it is a maximum of 40 mm;

said support tubes being constituted of alumina having a purity of greater than 97% and a mean crystal size of greater than 10 microns;

said sintering occurring as a sintering cycle comprising a temperature rise up to a temperature of between 1450° C. and 1550° C. followed by a plateau of 1 to 3 hours duration at a temperature of between 1450° C. and 1550° C., followed by cooling, with the time elapsed between the commencement of the temperature rise and the end of said plateau not exceeding 38 hours.

2. The method according to claim 1, wherein the tube pre-forms have an inside diameter of 1.85 to 2.1 mm and an outside diameter of 3.3 to 3.7 mm, said support tubes having an inside diameter of up to 8 mm.

3. The method according to claim 1, wherein the support tubes have inside surfaces which do not substantially deviate from that of an ideal cylinder, such that any defect in the straightness of the inside surface is less than 0.1 mm over a length of 90 mm.

4. The method according to claim 1, wherein the support tubes are constituted of alumina having a purity of greater than 98%.

5. The method according to claim 4, wherein the support tubes are constituted of alumina having a purity of greater than 99.5%.

6. The method according to claim 1, wherein each stack is formed by at least 5 layers of support tubes.

7. The method of claim 1, wherein the tube pre-forms are sintered in the furnace in batches, each such batch comprising a multiplicity of charge units such that the layers of the support tubes containing the tube pre-forms are arranged such that they are placed one above the other on the support plate, with the support plates being arranged one above another and pillars comprised of a refractory material being present to support one support plate immediately above another support plate.

8. The method according to claim 1, wherein the tube pre-forms are comprised of a mineral portion comprised of yttriated zirconia containing 2 to 4 mol % $Y_2O_3$ and constituted of particles having a mean size of less than 1 micron.

9. The method according to claim 1, wherein the ratio of the inside diameter of the support tubes to the outside diameter of the tube pre-forms is greater than 1.25.

10. The method according to claim 1, wherein the ratio of the length of a support tube to the length of a tube pre-form is in the range of 0.85 to 1.5, when each support tube contains only one tube pre-form.

11. A method for sintering tube pre-forms in a furnace to thereby obtain ceramic tubes having excellent straightness which comprises placing said tube pre-forms inside support tubes, said tube pre-forms having an inside diameter of 1.8 to 2.2 mm and an outside diameter of 3 to 4 mm, said support tubes having an inside diameter greater than 4.5 mm, each such support tube containing one tube pre-form or a multiplicity of tube pre-forms arranged in longitudinal alignment;

wherein the support tubes containing the tube pre-forms are arranged parallel to one another thereby forming a multiplicity of stacks of layers including a top layer which are supported by a multiplicity of support plates comprised of a refractory material, each support tubes containing the tube pre-forms, each stacks of layers and each support plate constituting a charge unit, and wherein in respect to each stack, the distance between the top of the top layer and a support plate immediately above it is a maximum of 40 mm;

said support tubes being constituted of alumina having a purity of greater than 97% and a mean crystal size of greater than 10 microns;

said sintering occurring as a sintering cycle comprising a temperature rise up to a temperature of between 1450° C. and 1550° C. followed by a plateau of 1 to 3 hours duration at a temperature of between 1450° C. and 1550° C., followed by cooling, with the time elapsed between the commencement of the temperature rise and the end of said plateau not exceeding 38 hours;

said tube pre-forms being comprised of a mineral portion comprised of yttriated zirconia containing 2 to 4 mol % $Y_2O_3$ and constituted of particles having a mean size of less than 1 micron.

12. The method according to claim 11, wherein the tube pre-forms have an inside diameter of 1.85 to 2.1 mm and an outside diameter of 3.3 to 3.7 mm, said support tubes having an inside diameter of up to 8 mm.

13. The method according to claim 11, wherein the support tubes have inside surfaces which do not substantially deviate from that of an ideal cylinder, such that any defect in the straightness of the inside surface is less than 0.1 mm over a length of 90 mm.

14. The method according to claim 11, wherein the support tubes are constituted of alumina having a purity of greater than 98%.

15. The method according to claim 14, wherein the support tubes are constituted of alumina having a purity of greater than 99.5%.

16. The method according to claim 11, wherein each stack is formed by at least 5 layers of support tubes.

17. The method of claim 11, wherein the tube pre-forms are sintered in the furnace in batches, each such batch comprising a multiplicity of charge units such that the layers of the support tubes containing the tube pre-forms are arranged such that they are placed one above the other on the support plate, with the support plates being arranged one above another and pillars comprised of a refractory material being present to support one support plate immediately above another support plate.

18. The method according to claim 11, wherein the ratio of the inside diameter of the support tubes to the outside diameter of the tube pre-forms is greater than 1.25.

19. The method according to claim 11, wherein the ratio of the length of a support tube to the length of a tube pre-form is in the range of 0.85 to 1.5, when each support tube contains only one tube pre-form.

* * * * *